United States Patent [19]

Kobayashi et al.

[11] Patent Number: 5,115,173
[45] Date of Patent: May 19, 1992

[54] AIR GAP CONTROLLING SYSTEM FOR LINEAR MOTOR

[75] Inventors: Noboru Kobayashi, Kobe; Hiromu Miki, Akashi, both of Japan

[73] Assignee: Kawasaki Jukogyo Kabushiki Kaisha, Kobe, Japan

[21] Appl. No.: 735,555

[22] Filed: Jul. 25, 1991

[30] Foreign Application Priority Data

Jul. 30, 1990 [JP] Japan .................. 2-203585
Jul. 30, 1990 [JP] Japan .................. 2-203586
Jul. 30, 1990 [JP] Japan .................. 2-203587

[51] Int. Cl.$^5$ ........................................ H02K 41/00
[52] U.S. Cl. .................................... 318/135; 104/293; 310/12
[58] Field of Search ............... 310/12; 318/135; 104/287, 288, 290, 292, 293

[56] References Cited

U.S. PATENT DOCUMENTS 3,800,708 4/1974 English et al. .............. 104/293
3,845,721 11/1974 Wagner ..................... 104/291

FOREIGN PATENT DOCUMENTS 1275187 5/1972 United Kingdom .
1558674 1/1980 United Kingdom .

Primary Examiner—Steven L. Stephan
Assistant Examiner—Judson H. Jones
Attorney, Agent, or Firm—Schwartz & Weinrieb

[57] ABSTRACT

An air gap controlling system for a linear motor wherein a comparatively small air gap can be assured between a truck-carried element and a ground-mounted element to assure a high efficiency of the linear motor and construction for driving such ground-mounted element is simplified. Driving means is provided on each truck for driving a truck-carried element of a linear motor to be displaced upwardly or downwardly to adjust an air gap between the truck-carried element and an opposing ground-mounted element which also constitutes the linear motor, and an aimed value of the air gap between the two elements is set in response to a running speed of a velocity of the truck and a truck position signal representative of a position of the truck. At the first truck, the driving means is controlled so that the air gap may be equal to the air gap instruction value which is a rather high value. An air gap aimed value is set similarly for each of the trucks succeeding to the first truck, but is corrected so that an air gap of a succeeding truck may be controlled to a low value so as to assure a high efficiency of the linear motor.

10 Claims, 12 Drawing Sheets

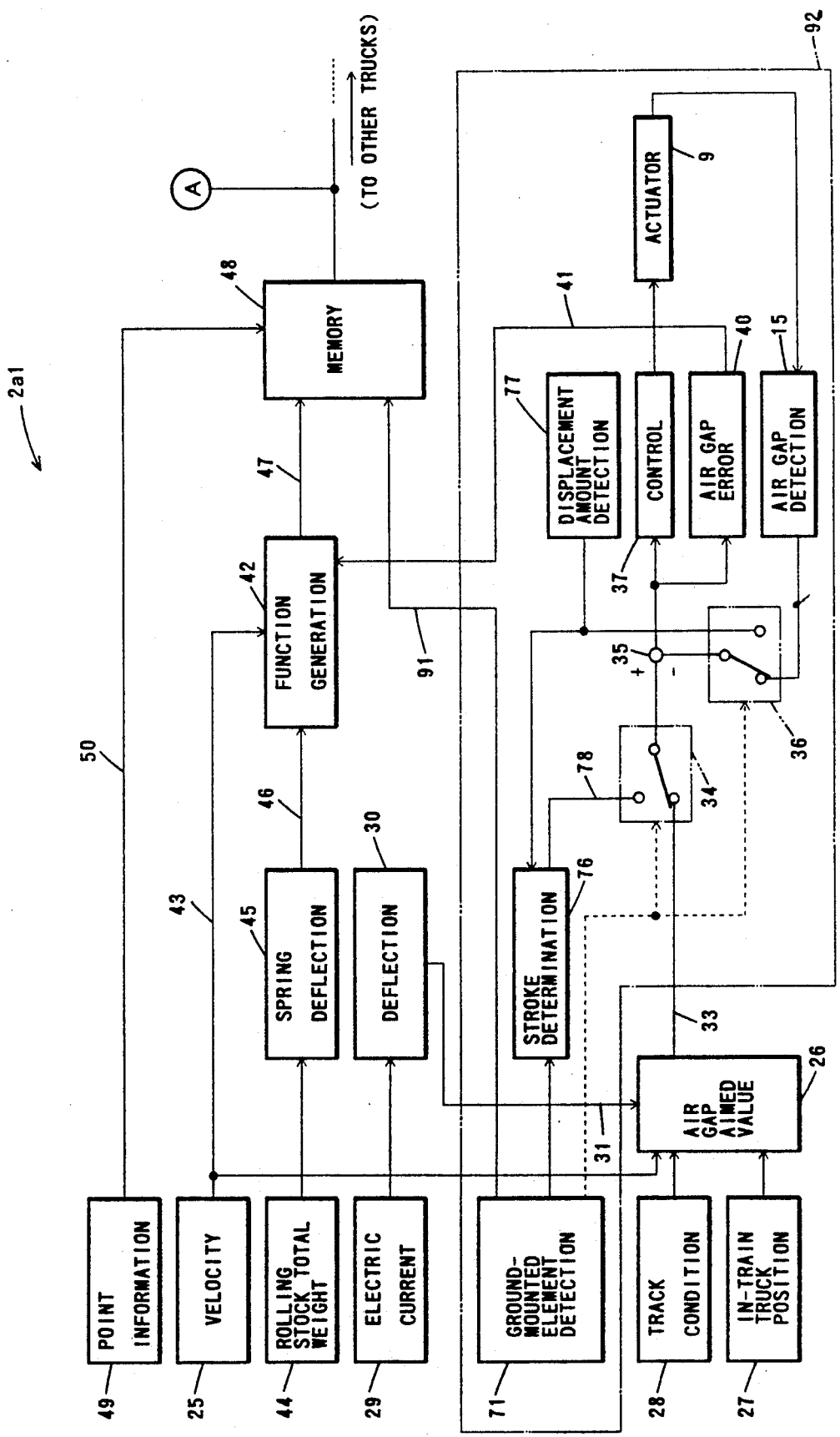

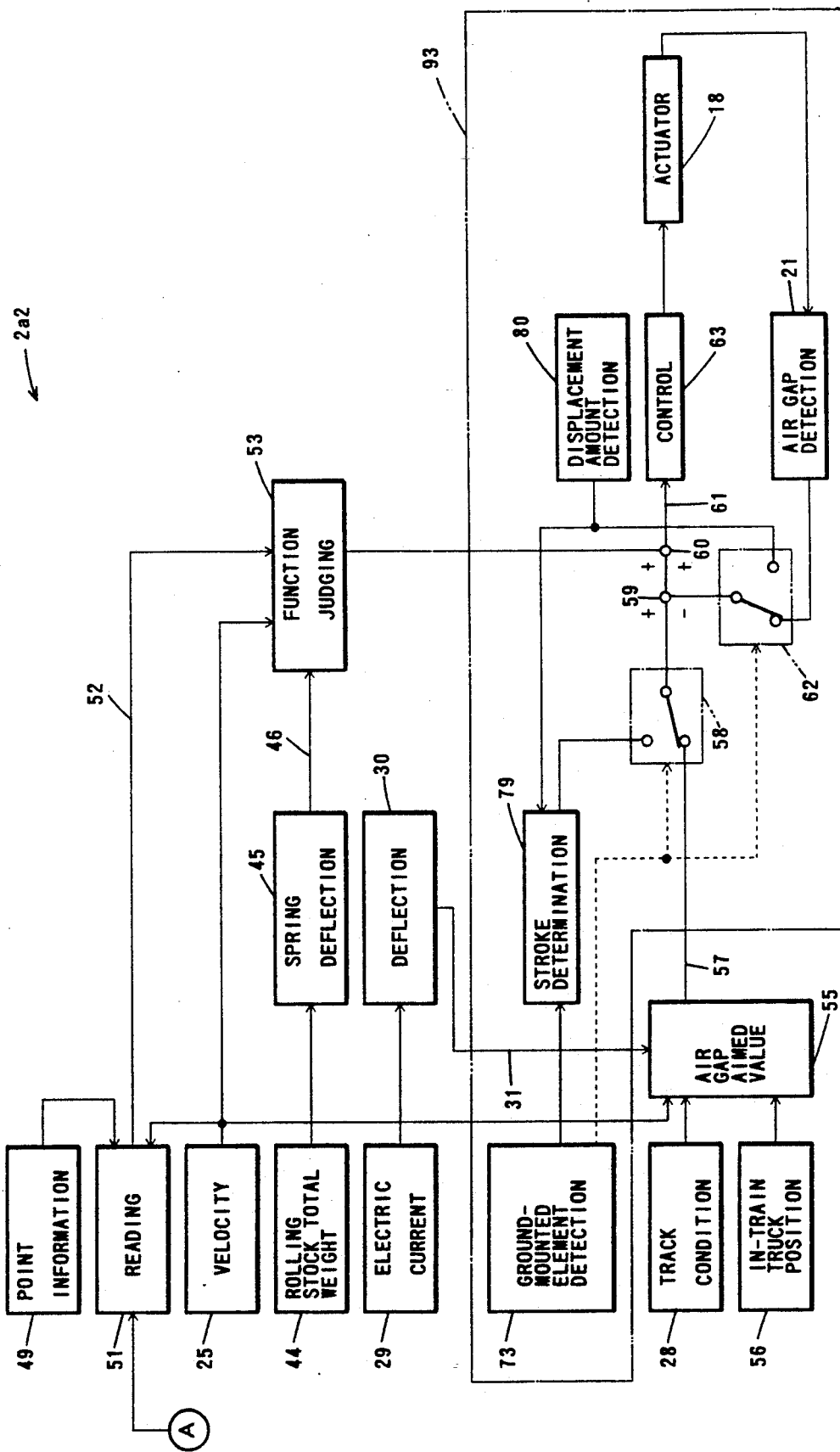

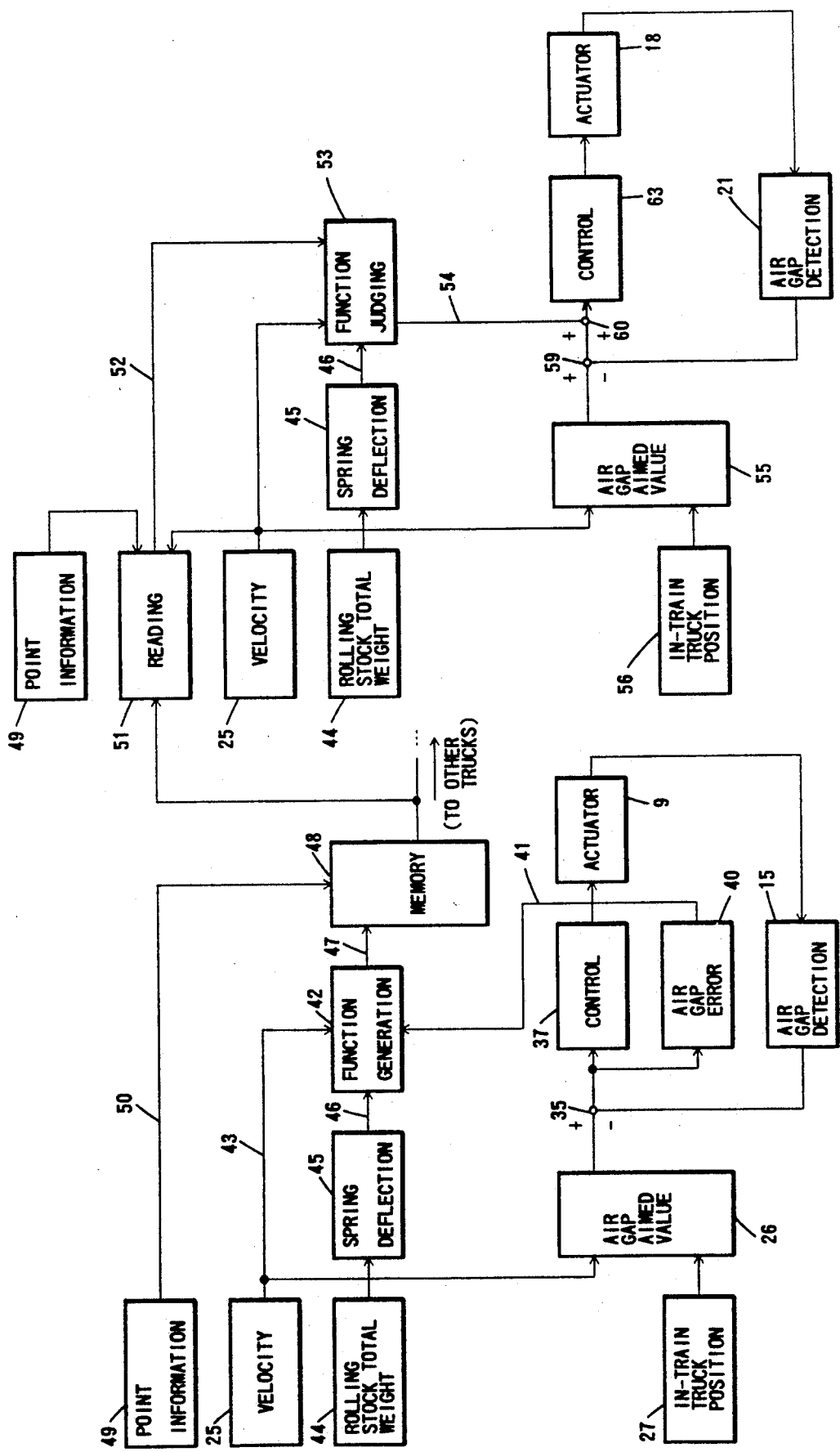

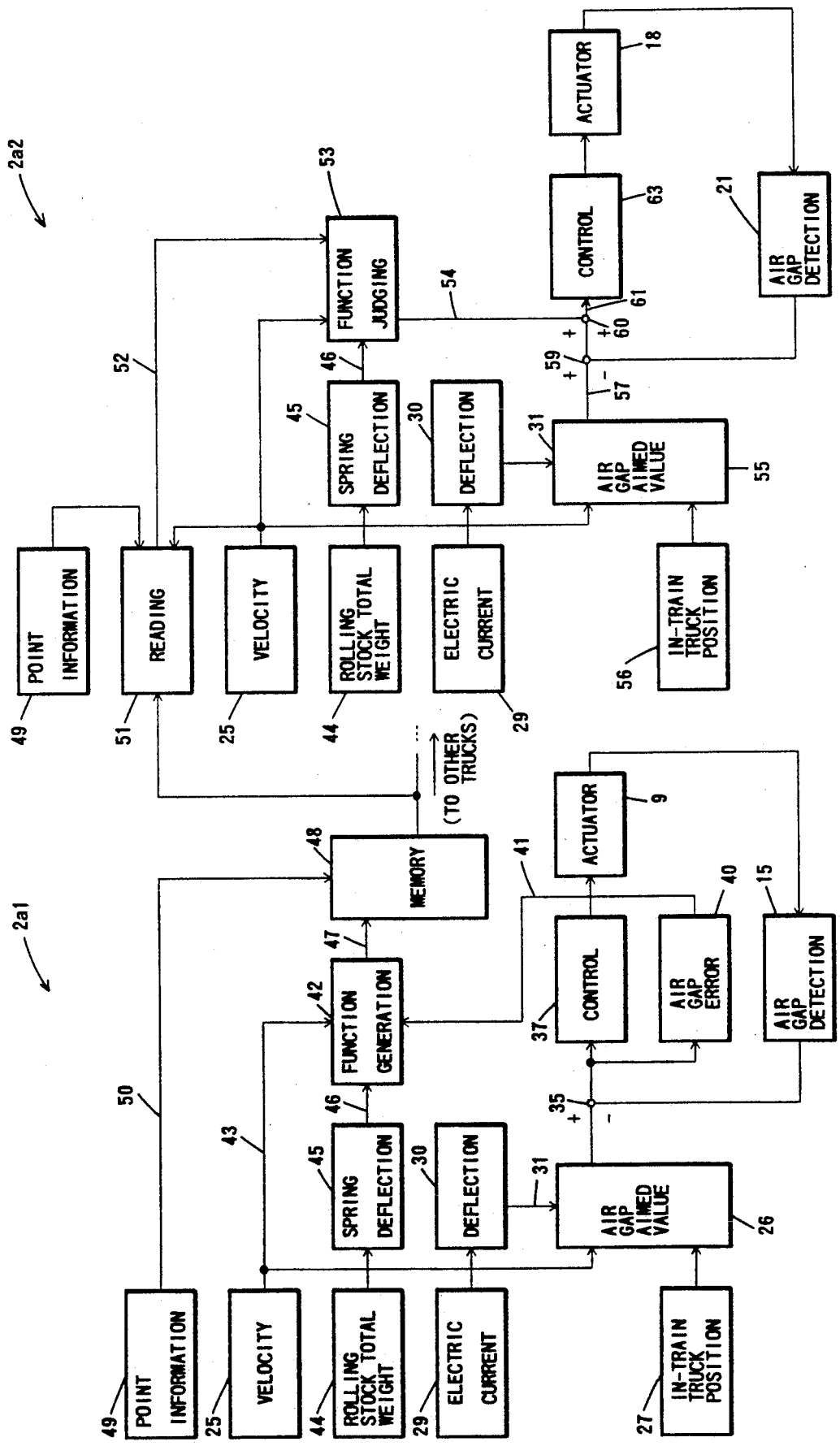

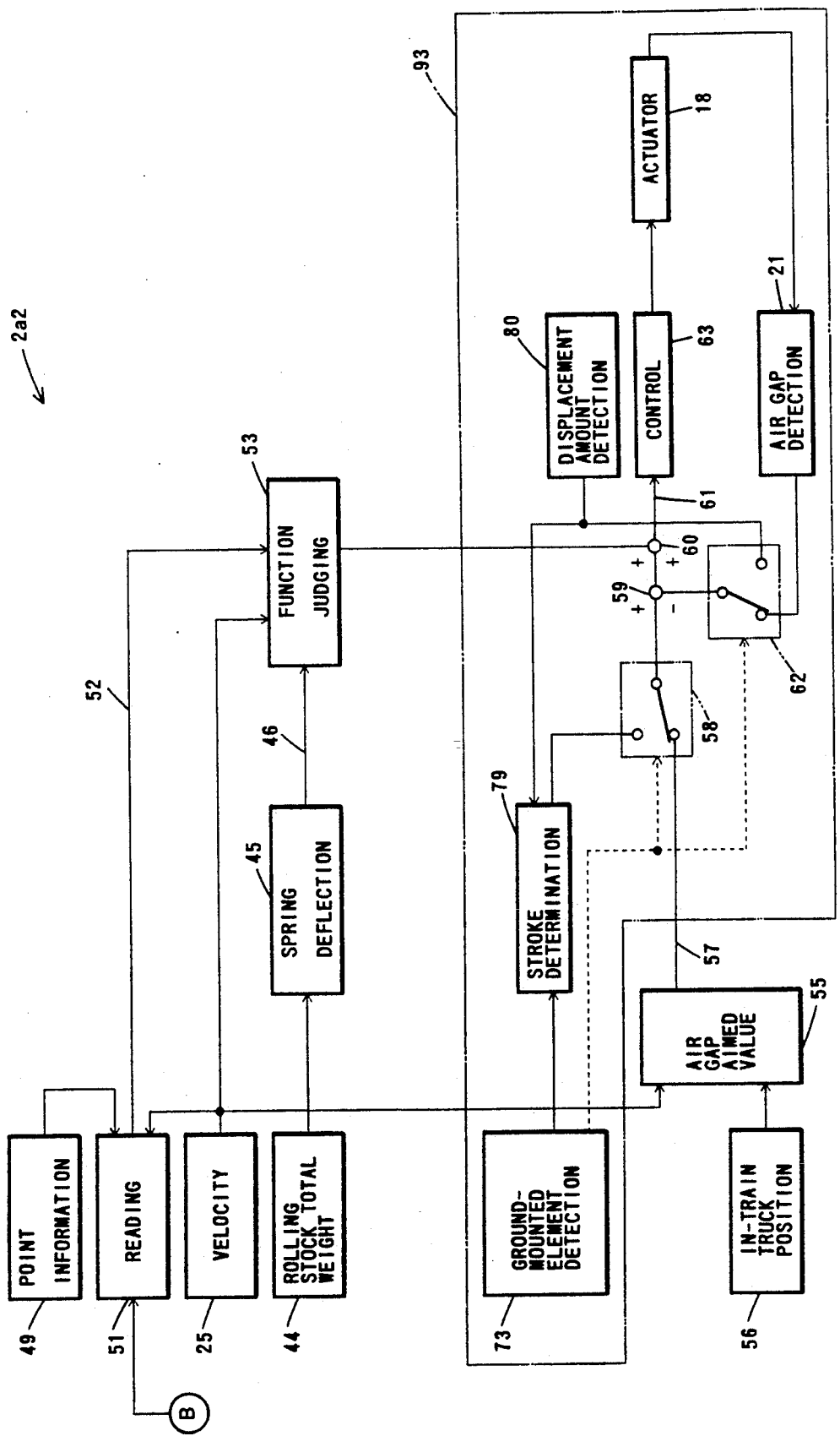

AIR GAP CONTROLLING SYSTEM FOR LINEAR MOTOR

BACKGROUND OF THE INVENTION

1. Field of the Invention

This invention relates to a system for controlling an air gap between a truck-carried element and a ground-mounted element of a linear motor which is used to propel a rolling stock of a railway or the like.

2. Description of the Prior Art

Various air gap controlling systems for a linear motor are already known, and an exemplary one of such conventional air gap controlling systems is disclosed, for example, in Japanese Patent Laid-Open Application No. 59-164264. The air gap controlling system is constructed such that a truck-carried element of a linear motor is carried directly on an axle which is mounted for yawing displacement on a truck. With the air gap controlling system, the air gap between a truck-carried element carried directly on an axle and a ground-mounted element mounted securely on the ground cannot readily be reduced to a value lower than 12 mm in a so-called standard condition, and accordingly, the efficiency of the linear motor is low at 55% or so with an air gap of 12 mm.

As factors which compel assurance of a large air gap between a truck-carried element and a ground-mounted element of a linear motor, there are, on the side of a truck-carried element, a tolerance in mounting of the truck-carried element, abrasion of a wheel and so forth, and on the side of a ground-mounted element, a tolerance in mounting of the ground-mounted element, a margin to maintenance recursion and so forth, and it is considered that, in order to prevent the truck-carried element and the ground-mounted element from colliding with each other in spite of those factors, an air gap of 6 to 7 mm must be assured.

Furthermore, if power is supplied to a truck-carried element and a ground-mounted element which constitute a linear motor, then an attracting force is produced between the truck-carried element and the ground-mounted element, and deflection takes place in both of the truck-carried element and the ground-mounted element due to such attracting force, vibrations and so forth. The amount of deformation of such deflection is normally about 2 mm. Further about 2 mm is required for a sink of a rail, a drop at a joint of rails and so forth, and besides further about 2 mm is required as a minimum margin. Such air gap must be increased as the running speed of the rolling stock is raised.

Accordingly, with the conventional air gap controlling system described above, it is difficult to make the air gap between a truck-carried element and a ground-mounted element smaller than 12 mm, and consequently, the efficiency of the linear motor is low.

Another exemplary one of conventional air gap controlling systems is disclosed in Japanese Patent Laid-Open Application No. 57-68608. According to the air gap controlling system, an air gap detector having a contact element for contacting with a ground-mounted element is provided on a truck-carried element carried on a truck, and a voltage from the air gap detector indicative of an air gap and a reference voltage from a reference voltage generator are supplied to a comparator. An output of the comparator is amplified and supplied to a servomotor, by which a hydraulic directional control valve is driven to supply pressure coil from a hydraulic oil source to a double acting hydraulic cylinder provided between a side beam of the truck and the truck-carried element so that the double acting hydraulic cylinder is operated to displace the truck-carried element upwardly or downwardly to control the air gap between the truck-carried element and the ground-mounted element. According to such conventional air gap controlling system, the servomotor is operated only in response to information obtained from the air gap detector and operates the hydraulic cylinder to control the air gap between the truck-carried element and the ground-mounted element.

With such conventional air gap controlling system, since the air gap detector is provided at the same location as the truck-carried element, even if the responding speeds of the servomotor, double acting hydraulic cylinder and so forth are high, it is difficult to control the air gap sufficiently due to a delay in response of the air gap detector because the speed of the rolling stock is high with respect to a sink of a rail, a drop at a junction between rails and an offset between ground-mounted elements. Besides, since the inertia of the truck-carried element is high, a rise of the responding speed of the truck-carried element results in increase in size of the construction and waste of energy. Further, deflection takes place in the truck-carried element and/or the ground-mounted element due to an attracting force or vibrations which are produced when power is supplied to the ground-mounted element and the truck-carried element, and it is difficult to achieve an appropriate air gap in spite of such variation in air gap because the air gap detector is mounted on the ground-mounted element. Accordingly, with such conventional air gap controlling system as described above, the amount of decrease in air gap by air gap control is about 6 mm.

A ground-mounted element which constitutes a linear motor is not installed at a branching location of rails. Accordingly, with the conventional air gap controlling system described above, the air gap detector may detect a surface of the ground below a ground-mounted element, a rail extending across and between a pair of rails or the like as a ground-mounted element in error. If such erroneous detection takes place, then the truck-carried element will be displaced downwardly by the hydraulic cylinder. If the truck runs after than at a location where a ground-mounted element is installed on the ground while the truck-carried element is held at the downwardly displaced position, then the truck-carried element may collide with and be broken by or break the ground-mounted element.

SUMMARY OF THE INVENTION

It is an object of the present invention to provide an air gap controlling system for a linear motor wherein a comparatively small air gap can be assured between a truck-carried element and a ground-mounted element to assure a high efficiency of the linear motor.

It is another object of the present invention to provide an air gap controlling system for a linear motor which is simplified in construction for driving a ground-mounted element.

It is a further object of the present invention to provide an air gap controlling system for a linear motor which prevents possible collision between a truck-carried element and a ground-mounted element.

In order to attain the objects, according to an aspect of the present invention, there is provided an air gap controlling system for a linear motor which is constituted from a truck-carried element mounted on each of a plurality of trucks of each of a plurality of rolling stocks of a train and a plurality of ground-mounted elements secured to the ground along a running route of the trucks, comprising driving means for driving each of the truck-carried elements to be displaced upwardly or downwardly, velocity detecting means for detecting a running speed of the rolling stocks, truck position signal generating means for generating a truck position signal indicative of a position of each of the trucks in the train, air gap aimed value setting means provided on each of the trucks for setting an aimed value of an air gap between each of the truck-carried elements of each of the trucks and an opposing ground-mounted element in response to outputs of the corresponding velocity detecting means and the corresponding truck position signal generating means, air gap detecting means provided for each of the driving means for detecting an air gap between the corresponding truck-carried element and an opposing ground-mounted element, controlling means provided for each of the driving means for controlling the driving means in response to an air gap instruction value and an output of a detected air gap of the corresponding air gap detecting means so that the detected air gap may be equal to the air gap instruction value, air gap error detecting means provided on a first one of the trucks for detecting an air gap error between an air gap aimed value from the corresponding air gap aimed value setting means and a detected air gap from the corresponding air gap detecting means, the air gap aimed value from the air gap aimed value setting means on the first truck being provided as an air gap instruction value to the controlling means for the first truck to effect control of an air gap of the first truck, point information generating means for generating information of a point where each of the truck-carried elements passes along the running route, weight detecting means for detecting a weight of each of the rolling stocks, forecasting signal generating means for generating forecasting signals from a relation of an air gap error from the air gap error detecting means to a detected velocity from the velocity detecting means and detected weights from the weight detecting means, storage means for storing therein forecasting signals from the forecasting signal generating means in a corresponding relationship to point information from the point information generating means, and correcting means provided on those of the trucks succeeding to the first truck for correcting air gap aimed values from the air gap aimed value setting means provided on the succeeding trucks with forecasting signals from the storage means corresponding to points at which the succeeding trucks run and for providing the thus corrected air gap aimed values as air gap instruction values to the controlling means for the succeeding trucks.

In accordance with the present invention, a truck-carried element of a linear motor such as a linear induction motor is mounted on each of a plurality of trucks of each of a plurality of rolling stocks of a train while a plurality of ground-mounted elements are secured to the ground along a running route of the trucks. Driving means such as a double acting hydraulic cylinder is provided on each of the trucks for driving the corresponding truck-carried element to be displaced upwardly or downwardly to adjust an air gap between the truck-carried element and an opposing ground-mounted element, and an aimed value of the air gap between such truck-carried element and the opposing ground-mounted element is set in response to a running speed of the velocity detected by velocity detecting means and a truck position signal representative of a truck position of the truck. At the first truck, the driving means is controlled by controlling means so that the air gap may be equal to the air gap instruction value which is a rather high value than an air gap instruction value for the succeeding trucks in order to assure that the truck-carried element and the ground mounted element may not collide with each other.

An air gap aimed value is set similarly for each of the trucks succeeding to the first truck, but is corrected by correcting means. The thus corrected value is provided as an air gap instruction value to each of controlling means for the succeeding trucks so that an air gap between a truck-carried element and an opposing ground-mounted element of the succeeding truck is controlled to a low value so as to assure a high efficiency of the linear motor.

In order to correct an air gap aimed value at a succeeding truck, an air gap error between an air gap aimed value and an actually detected air gap is detected at the first truck, and forecasting signals are produced in accordance with a preset function from a relation of such air gap error to a velocity detected by the velocity detecting means and total weights of the rolling stocks or weights acting on the trucks. Such forecasting signals are stored into storage means in a corresponding relationship to point information from point information generating means. Then, that one of the forecasting signals stored in the storage means which corresponds to a point at which a succeeding truck runs is read out from the storage means, and an air gap aimed value for the succeeding truck is corrected with the thus read out forecasting signal. In this manner, a control delay amount which is an air gap error at the first truck which is caused by a sink of a rail, a drop of a wheel into a junction of rails, vibrations of the rolling stock by such sink or drop or an offset between adjacent ground-mounted elements is temporarily stored from time to time in the form of a function relating to a velocity and a weight of the rolling stock including passengers into the storage means, and at a succeeding truck to the first truck, an air gap is controlled taking a forecasting signal representative of a control delay amount corresponding to a point at which the succeeding truck runs into consideration as control information for predictor controlling the truck-carried element of the succeeding truck. Consequently, the air gap between the truck-carried element of the succeeding truck and an opposing ground-mounted element can be controlled to a small value. Further, due to such predictor control of an air gap of a succeeding truck as described above, it is no more necessary to particularly improve the responsibility of the driving means for driving the truck-carried element of the succeeding truck, and accordingly, the construction can be reduced in size and waste of energy can be prevented. Further, the capacity of the driving means can be reduced, and consequently, the rolling stock can be reduced in weight.

The point information generating means may include signal generating means for generating signals representative of positions of a plurality of fixed points provided in a spaced relationship along the running route, and means provided on one of the rolling stocks for receiving an output of the signal generating means and calculating a point between two adjacent ones of the fixed points in accordance with the thus received output of the signal generating means.

Alternatively, the point information generating means may produce information regarding points corresponding to relative positions of the succeeding trucks in the train with respect to the first truck.

The air gap controlling system may further comprise track condition signal generating means for generating a track condition signal indicative of a condition of a track where each of the trucks runs, and each of the air gap aimed value setting means may set an aimed value of an air gap also in response to a track condition signal received from the corresponding track condition signal generating means.

According to another aspect of the present invention, there is provided an air gap controlling system for a linear motor which is constituted from a truck-carried element mounted on each of a plurality of trucks of each of a plurality of rolling stocks of a train and a plurality of ground-mounted elements secured to the ground along a running route of the trucks, comprising driving means for driving each of the truck-carried elements to be displaced upwardly or downwardly, velocity detecting means for detecting a running speed of the rolling stocks, deformation amount signal generating means for detecting a driving electric current of each of the truck-carried elements to produce a deformation amount signal representative of amounts of deformation of the truck-carried element and an opposing ground-mounted element corresponding the driving electric current, truck position signal generating means for generating a truck position signal indicative of a position of each of the trucks in the train, air gap aimed value setting means provided on each of the trucks for setting an aimed value of an air gap between each of the truck-carried elements of each of the trucks and an opposing ground-mounted element in response to outputs of the corresponding velocity detecting means, the corresponding truck position signal generating means and the corresponding deformation amount signal generating means, air gap detecting means provided for each of the driving means for detecting an air gap between the corresponding truck-carried element and an opposing ground-mounted element, controlling means provided for each of the driving means for controlling the driving means in response to an air gap instruction value and an output of a detected air gap of the corresponding air gap detecting means so that the detected air gap may be equal to the air gap instruction value, air gap error detecting means provided on a first one of the trucks for detecting an air gap error between an air gap aimed value from the corresponding air gap aimed value setting means and a detected air gap from the corresponding air gap detecting means, the air gap aimed value from the air gap aimed value setting means on the first truck being provided as an air gap instruction value to the controlling means for the first truck to effect control of an air gap of the first truck, point information generating means for generating information of a point where each of the truck-carried elements passes along the running route, weight detecting means for detecting a weight of each of the rolling stocks, forecasting signal generating means for generating forecasting signals from a relation of an air gap error from the air gap error detecting means to a detected velocity from the velocity detecting means and detected weights from the weight detecting means, storage means for storing therein forecasting signals from the forecasting signal generating means in a corresponding relationship to point information from the point information generating means, and correcting means provided on those of the trucks succeeding to the first truck for correcting air gap aimed values from the air gap aimed value setting means provided on the succeeding trucks with forecasting signals from the storage means corresponding to points at which the succeeding trucks run and for providing the thus corrected air gap aimed values as air gap instruction values to the controlling means for the succeeding trucks.

In accordance with the present invention, a truck-carried element of a linear motor such as a linear induction motor is mounted on each of a plurality of trucks of each of a plurality of rolling stocks of a train while a plurality of ground-mounted elements are secured to the ground along a running route of the trucks. Driving means such as a double acting hydraulic cylinder is provided on each the trucks for driving the corresponding truck-carried element to be displaced upwardly or downwardly to adjust an air gap between the truck-carried element and an opposing ground-mounted element, and an aimed value of an air gap between such truck-carried element and an opposing ground-mounted element is set in response to a running speed of the velocity detected by velocity detecting means, a truck position signal representative of a truck position of the truck, and a signal indicative of amounts of deformation of the truck-carried element and the ground-mounted element corresponding to a driving electric current of the truck-carried element. At the first truck, the driving means is controlled by controlling means so that the air gap may be equal to the air gap instruction value which is a rather high value than an air gap instruction value for the succeeding trucks in order to assure that the truck-carried element and the ground mounted element may not collide with each other.

An air gap aimed value is set similarly for each of the succeeding trucks to the first truck, but is corrected by correcting means. The thus corrected value is provided as an air gap instruction value to each of controlling means for the succeeding trucks so that an air gap between a truck-carried element and an opposing ground-mounted element of the succeeding truck is controlled to a low value so as to assure a high efficiency of the linear motor.

In order to correct an air gap aimed value at a succeeding truck, an air gap error between an air gap aimed value and an actually detected air gap is detected at the first truck, and forecasting signals are produced in accordance with a preset function from a relation of such air gap error to a velocity detected by the velocity detecting means and total weights of the rolling stocks or weights acting on the trucks. Such forecasting signals are stored into storage means in a corresponding relationship to point information from point information generating means. Then, that one of the forecasting signals stored in the storage means which corresponds to a point at which a succeeding truck runs is read out from the storage means, and an air gap aimed value for the succeeding truck is corrected with the thus read out forecasting signal. In this manner, a control delay amount which is an air gap error at the first truck which is caused by a sink of a rail, a drop of a wheel into a junction of rails, vibrations of the rolling stock by such sink or drop or an offset between adjacent ground-mounted elements is temporarily stored from time to time in the form of a function relating to a velocity and a weight of the rolling stock including passengers into the storage means, and at a succeeding truck to the first truck, an air gap is controlled taking a forecasting signal representative of a control delay amount corresponding to a point at which the succeeding truck runs into consideration as control information for predictor controlling the truck-carried element of the succeeding truck. Consequently, the air gap between the truck-carried element of the succeeding truck and an opposing ground-mounted element can be controlled to a small value. Further, due to such predictor control of an air gap of a succeeding truck as described above, it is no more necessary to particularly improve the responsibility of the driving means for driving the truck-carried element of the succeeding truck, and accordingly, the construction can be reduced in size and waste of energy can be prevented. Further, the capacity of the driving means can be reduced, and consequently, the rolling stock can be reduced in weight.

Further, a driving electric current of a truck-carried element constituting the linear motor is detected, and a deformation amount signal representative of an amount of deformation such as downward deflection of the truck-carried element and an amount of deformation such as upward deflection of an opposing ground-mounted element is produced in accordance with the thus detected driving electric current. Then, an air gap aimed value is set also taking such deformation amount signal into consideration.

According to a further aspect of the present invention, there is provided an air gap controlling system for a linear motor which is constituted from a truck-carried element mounted on each of a plurality of trucks of each of a plurality of rolling stocks of a train and a plurality of ground-mounted elements secured to the ground along a running route of the trucks, comprising driving means for driving each of the truck-carried elements to be displaced upwardly or downwardly, velocity detecting means for detecting a running speed of the rolling stocks, truck position signal generating means for generating a truck position signal indicative of a position of each of the trucks in the train, air gap aimed value setting means provided on each of the trucks for setting an aimed value of an air gap between each of the truck-carried elements of each of the trucks and an opposing ground-mounted element in response to outputs of the corresponding velocity detecting means and the corresponding truck position signal generating means, air gap detecting means provided for each of the driving means for detecting an air gap between the corresponding truck-carried element and an opposing ground-mounted element, ground-mounted element detecting means provided for each of the driving means for detecting presence or absence of a ground-mounted element, controlling means provided for each of the driving means for determining, when presence of a ground-mounted element is detected by the corresponding ground-mounted element detecting means, an aimed value from the corresponding air gap aimed value setting means as an air gap instruction value and controlling the corresponding driving means in response to the air gap instruction value and an output of a detected air gap from the corresponding air gap detecting means so that the detected air gap may be equal to the air gap instruction value but for controlling, when presence of no ground-mounted element is detected by the corresponding ground-mounted element detecting means, the corresponding driving means so that the corresponding truck-carried element may be positioned at a predetermined upper position, air gap error detecting means provided on a first one of the trucks for detecting an air gap error between an air gap aimed value from the corresponding air gap aimed value setting means and a detected air gap from the corresponding air gap detecting means, the air gap aimed value from the air gap aimed value setting means on the first truck being provided as an air gap instruction value to the controlling means for the first truck to effect control of an air gap of the first truck when a ground-mounted element opposing to the truck-carried element on the first truck is present, point information generating means for generating information of a point where each of the truck-carried elements passes along the running route, weight detecting means for detecting a weight of each of the rolling stocks, forecasting signal generating means for generating forecasting signals from a relation of an air gap error from the air gap error detecting means to a detected velocity from the velocity detecting means and detected weights from the weight detecting means, storage means for storing therein forecasting signals from the forecasting signal generating means in a corresponding relationship to point information from the point information generating means, and correcting means provided on those of the trucks succeeding to the first truck for correcting air gap aimed values from the air gap aimed value setting means provided on the succeeding trucks with forecasting signals from the storage means corresponding to points at which the succeeding trucks run and for providing the thus corrected air gap aimed values as air gap instruction values to the controlling means for the succeeding trucks when an opposing ground-mounted element is present.

In accordance with the present invention, a truck-carried element of a linear motor such as a linear induction motor is mounted on each of a plurality of trucks of each of a plurality of rolling stocks of a train while a plurality of ground-mounted elements are secured to the ground along a running route of the trucks. Driving means such as a double acting hydraulic cylinder is provided on each the trucks for driving the corresponding truck-carried element to be displaced upwardly or downwardly to adjust an air gap between the truck-carried element and an opposing ground-mounted element, and an aimed value of an air gap between such truck-carried element and an opposing ground-mounted element is set in response to a running speed of the velocity detected by velocity detecting means and a truck position signal representative of a truck position of the truck. At the first truck, the driving means is controlled by controlling means so that the air gap may be equal to the air gap instruction value which is a rather high value than an air gap instruction value for the succeeding trucks in order to assure that the truck-carried element and the ground mounted element may not collide with each other.

An air gap aimed value is set similarly for each of the succeeding trucks to the first truck, but is corrected by correcting means. The thus corrected value is provided as an air gap instruction value to each of controlling means for the succeeding trucks so that an air gap between a truck-carried element and an opposing ground-mounted element of the succeeding truck is controlled to a low value so as to assure a high efficiency of the linear motor.

In order to correct an air gap aimed value at a succeeding truck, an air gap error between an air gap aimed value and an actually detected air gap is detected at the first truck, and forecasting signals are produced in accordance with a preset function from a relation of such air gap error to a velocity detected by the velocity detecting means and total weights of the rolling stocks or weights acting on the trucks. Such forecasting signals are stored into storage means in a corresponding relationship to point information from point information generating means. Then, that one of the forecasting signals stored in the storage means which corresponds to a point at which a succeeding truck runs is read out from the storage means, and an air gap aimed value for the succeeding truck is corrected with the thus read out forecasting signal. In this manner, a control delay amount which is an air gap error at the first truck which is caused by a sink of a rail, a drop of a wheel into a junction of rails, vibrations of the rolling stock by such sink or drop or an offset between adjacent ground-mounted elements is temporarily stored from time to time in the form of a function relating to a velocity and a weight of the rolling stock including passengers into the storage means, and at a succeeding truck to the first truck, an air gap is controlled taking a forecasting signal representative of a control delay amount corresponding to a point at which the succeeding truck runs into consideration as control information for predictor controlling the truck-carried element of the succeeding truck. Consequently, the air gap between the truck-carried element of the succeeding truck and an opposing ground-mounted element can be controlled to a small value. Further, due to such predictor control of an air gap of a succeeding truck as described above, it is no more necessary to particularly improve the responsibility of the driving means for driving the truck-carried element of the succeeding truck, and accordingly, the construction can be reduced in size and waste of energy can be prevented. Further, the capacity of the driving means can be reduced, and consequently, the rolling stock can be reduced in weight.

According to a still further aspect of the present invention, there is provided an air gap controlling system for a linear motor which is constituted from a truck-carried element mounted on each of a plurality of trucks of each of a plurality of rolling stocks of a train and a plurality of ground-mounted elements secured to the ground along a running route of the trucks, comprising driving means for driving each of the truck-carried elements to be displaced upwardly or downwardly, velocity detecting means for detecting a running speed of the rolling stocks, air gap instruction value generating means for generating an air gap instruction value with which an air gap between each of the truck-carried elements and an opposing ground-mounted element is to be adjusted to a predetermined value, ground-mounted element detecting means provided for each of the driving means for detecting presence or absence of a ground-mounted element opposing to the corresponding truck-carried element, and controlling means for controlling each of the driving means, when presence of no opposing ground-mounted element is detected by the corresponding ground-element detecting means, so that the corresponding truck-carried element may be positioned at a predetermined upper position but for controlling each of the driving means, when presence of an opposing ground-mounted element is detected, so that an air gap between the corresponding truck-carried element and the opposing ground-mounted element may be equal to a value defined by an air gap instruction value from the corresponding air gap instruction value generating means.

In accordance with the present invention, ground-mounted element detecting means for detecting presence or absence of a ground-mounted element opposing to a truck-carried element is provided for each of the driving means, and when presence of an opposing ground-mounted element is detected, an air gap between the truck-carried element and the ground-mounted element is controlled in such a manner as described above to assure a high efficiency of the linear motor. On the contrary, when presence of no opposing ground-mounted element is detected, the truck-carried element is positioned at a predetermined upper position so as to prevent possible collision between the truck-carried element and the ground-mounted element with certainty.

Each of the ground-mounted element detecting means may develop a signal representative of presence of a ground-mounted element when a ground-mounted element is continuously detected for a predetermined period of time corresponding to a running velocity of the rolling stocks detected by the velocity detecting means. Thus, such a possible erroneous operation can be prevented that, when the ground-mounted element detecting means passes a branching portion of a track such as rails, it may detect another rail, which extends across the rails, as a ground-mounted element in error and consequently the truck-carried element is displaced downwardly by the driving means so as to reduce the air gap. As a result, possible collision between the truck-carried element and the ground mounted element can be prevented with certainty, and besides it can be prevented to displace the truck-carried element upwardly and downwardly by an excessive amount to cause "dancing" of the truck-carried element. Thus, air gap control can be executed so that a minimum necessary air gap may normally be maintained.

Alternatively, each of the ground-mounted detecting means may continue to develop a signal representative of presence of no ground-mounted element when the running velocity of the rolling stocks is lower than a predetermined level after a condition wherein a ground-mounted element is no more detected has been entered. Thus, a possible error is prevented that, when the velocity of the rolling stocks is very low, another rail which extends across the rails of the track adjacent a branching location of the rails may be detected as a ground-mounted element in error and an instruction signal to displace the truck-carried element by means of the driving means is developed in error.

Or else, each of the ground-mounted element detecting means may include a pair of ground-mounted element detecting members provided on each of the rolling stocks in a spaced relationship in the running direction of the rolling stocks for detecting presence or absence of a ground-mounted element, and outputting means for developing a signal representative of presence of a ground-mounted element when a ground-mounted element is detected simultaneously by both of the ground-mounted element detecting members. Thus, if only one of the ground-mounted element detecting members detects presence of a ground-mounted, the ground-mounted element detecting means does not develop a signal representative of presence of a ground-mounted element, but only if presence of a ground-mounted element is detected by both of the ground-mounted element detecting members, the ground-mounted element detecting means develops such signal. Consequently, when the rolling stocks are running at a very low speed or even when they are in a stopping condition, such erroneous control can be prevented that another rail which extends across the rails of the track adjacent a branching location of the rails is detected as a ground-mounted element in error and consequently the ground-mounted element is displaced downwardly.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 1a and 1b are block diagrams of an air gap controlling system showing a preferred embodiment of the present invention;

FIG. 9 is a block diagram showing a modification to the air gap controlling system of FIGS. 1a and 1b;

FIG. 10 is a similar view but showing another modification to the air gap controlling system shown in FIGS. 1a and 1b; and FIGS. 11a and 11b are views similar to FIGS. 1a and 1b, respectively, but showing a further modification to the air gap controlling system of FIGS. 1a and 1b.

DESCRIPTION OF THE PREFERRED EMBODIMENT

Figure 2:
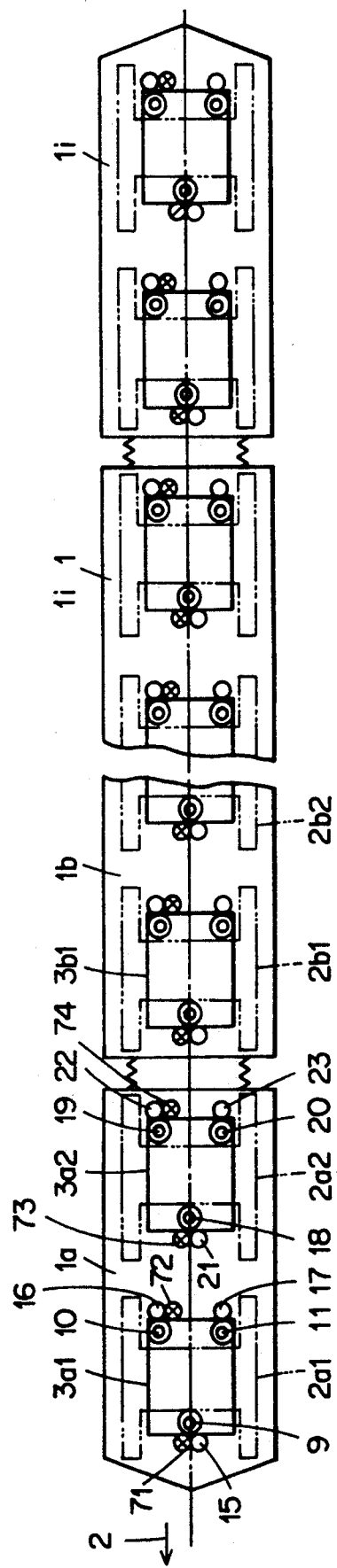
FIG. 2 is a plan view of a train of rolling stocks to which the air gap controlling system of FIGS. 1a and 1b is applied.

Referring first to FIGS. 1a and 1b, there is shown electric construction of an air gap controlling system for a linear motor to which the present invention is applied. The air gap controlling system is incorporated in such a train of rolling stocks 1a, 1b, 1c, ... 1i as shown in a simplified form in FIG. 2. Referring now to FIG. 2, the rolling stocks 1a to 1i of the train are connected in series to each other. The first rolling truck 1a has a pair of trucks 2a1 and 2a2 mounted on a body thereof in a spaced relationship in a running direction of the train indicated by an arrow mark 2. The second rolling stock 1b has another pair of trucks 2b1 and 2b2 mounted in a similar manner on a body thereof, and each of the other trucks 1c to 1i has a similar construction. Each of the trucks 2a1 and 2a2 of the first truck 1a has a pair of truck-carried elements 3a1 and 3a2 mounted on a truck frame thereof such that they extend in the running direction 2 of the train. Each of the trucks 2b1 and 2b2 of the second truck 1b has another pair of truck-carried element 3b1 and 3b2 mounted in a similar manner on a truck frame thereof, and such construction is common to the other rolling stocks.

Figure 3:
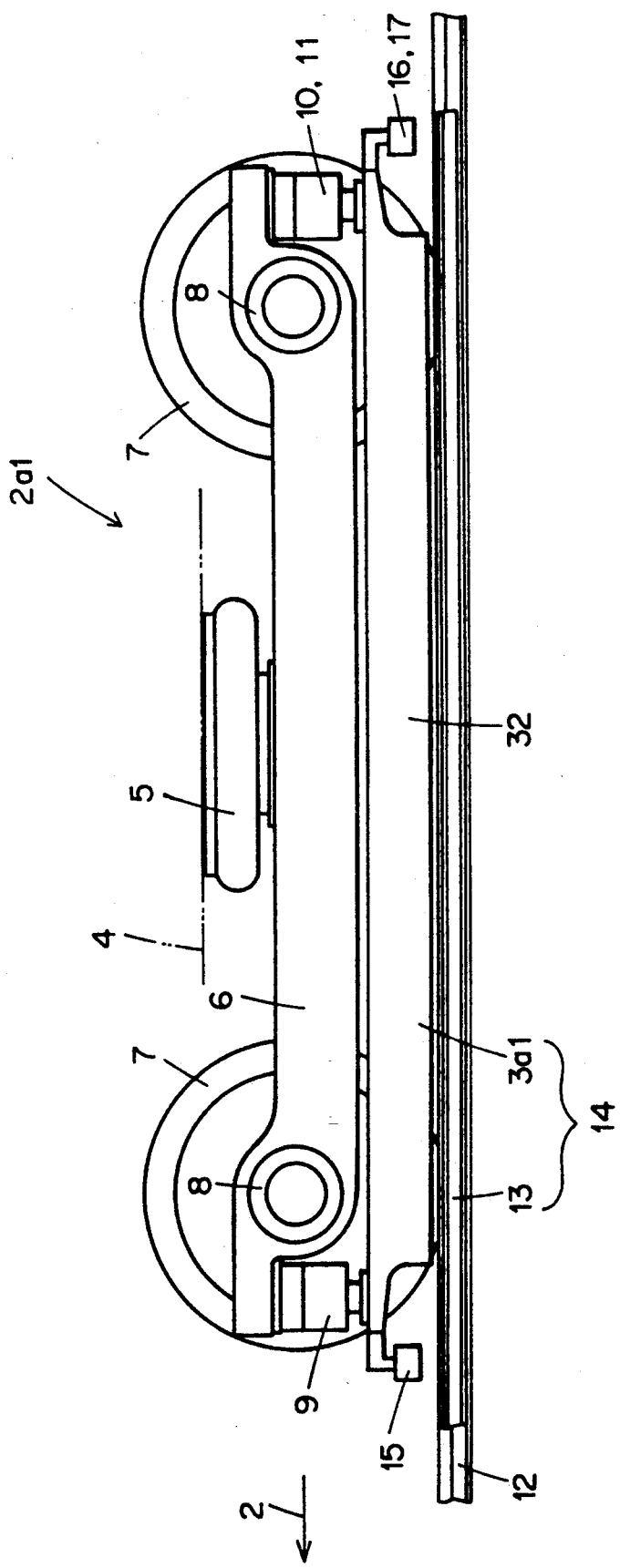
FIG. 3 is a side elevational view of a first truck of a first rolling stock shown in FIG. 2.

Referring now to FIG. 3, the top or first truck 2a1 is shown a simplified side elevational view. The truck 2a1 has a truck frame 6 on which a leading end portion of a body 4 of the rolling stock 1a is supported by way of an air spring 5. Two pairs of wheels 7 are mounted on the truck frame 6 of the truck 2a1 by way of respective axle springs 8. An actuator 9 serving as a driving means is mounted at the center of a leading portion of the truck frame 6 of the truck 2a1 in the running direction 2 while a pair of actuators 10 and 11 each serving as driving means are mounted at left and right rear portions of the truck frame 6 as also seen from FIG. 2. The truck-carried element 3a1 is supported for upward and downward driving displacement by means of the actuators 9, 10 and 11 on the truck frame 6.

The wheels 7 run on a pair of left and right rails 12 laid on the ground, and a linear motor 14 is constituted from a large number of ground-mounted elements 13 secured to the ground between the rails 12 along a running route of the rails 12. A propelling force acting in the running direction 2 is thus obtained from the linear motor 14. The actuators 9, 10 and 11 may each be constituted, for example, from a double acting hydraulic cylinder.

Referring also to FIG. 2, three gap detecting elements 15, 16 and 17 for detecting an air gap between the truck-carried element 3a1 and an opposing ground-mounted element 13 are mounted on the truck-carried element 3a1 adjacent the actuators 9, 10 and 11, respectively.

Similarly, three actuators 18, 19 and 20 and three air gap detecting elements 21, 22 and 23 are mounted on the second truck 3a2 of the first rolling stock 1a. Such construction is common also to the trucks of the other rolling stocks 1b to 1i.

Referring back to FIGS. 1a and 1b, velocity detecting means 25 detects a running velocity of the rolling stocks 1a to 1i and delivers the thus detected running velocity to an air gap aimed value setting circuit 26. Truck position signal generating means 27 generates a truck position signal indicating a position of the truck 3a1 of the rolling stock 2a1 in the train, i.e., indicating that the truck in question is the top or first truck, and delivers such truck position signal to the air gap aimed value setting circuit 26. When the detected velocity from the velocity detecting means 25 is high, an air gap aimed value is set so that it may have a correspondingly high value. The air gap aimed value setting means 26 selects and sets an aimed value for an air gap between the truck-carried element 3a1 of the first truck 2a1 and a ground-mounted on element 13 in response to outputs of the velocity detecting means 25 and truck position signal generating means 27. The air gap aimed value for the first truck 2a1 is set a little higher than that of the air gaps of the succeeding trucks 2a2, 2b1, 2b2, ... so as to prevent a possible collision between the truck-carried element 3a1 and a ground-mounted element 13 with certainty. In particular, the air gap aimed value is set to a little higher value for the first truck 2a1 by the air gap aimed value setting circuit 26 so that the truck-carried element 3a1 and a ground-mounted element 13 may not be contacted with each other due to a delay in control.

Such air gap aimed value set by the air gap aimed value setting means 26 also relies upon a track condition signal from means 28 for generating a signal indicative of a track condition. A track condition indicated by a track condition signal represents a condition of a line shape such as a transition curve, a circular curve or a straight line of the rails 12 which is a track on which the first truck 2a1 runs, as well as a superelevation amount and so forth, and setting of an air gap aimed value is performed so that the truck-carried element 3a1 and a ground-mounted element 13 may not collide with each other relying upon such condition of the track. Such setting of an air gap aimed value relying upon a condition of a track by the track condition signal generating means 28 is necessary to prevent a possible collision between the truck-carried element 3a1 and a ground-mounted element 13 even when the truck carried element 3a1 and a ground-mounted element 13 are caused to approach each other, on such a transition curve or a circular curve as mentioned hereinabove, by an influence of a twist and superelevation of the rails 12.

A driving current of the truck-carried element 3a1 is detected by current detecting means 29. A deformation amount signal indicative of an amount of deformation by which the track-carried element 3a1 is deformed downwardly in response to the thus detected current and another deformation amount by which a ground-mounted element 13 is deformed upwardly is generated by deformation amount generating means 30. Such deformation amount signal is transmitted to the air gap aimed value setting means 26 by way of a line 31 so that an air gap aimed value may be set relying on the driving current and hence on the deformation amounts. In other words, deformation amounts such as deflection amounts of the truck-carried element 3a1 and a ground-mounted element 13 are regarded as a function of the driving current and as a factor for setting an air gap aimed value. This is intended such as follows. When a driving current flows through the truck-carried element 3a1, the truck-carried element 3a1 and a ground-mounted element 13 both undergo deflective deformation due to an attracting force produced between the truck-carried element 3a1 and the ground-mounted element 13, and a maximum value of such deformation appears at or around a central position 32 of the truck-carried element 3a1 in the longitudinal direction (leftward and rightward direction in FIG. 3). Accordingly, while the air gap detecting means 15, 16 and 17 are preferably disposed at the central position 32 of the truck-carried element 3a1 in the longitudinal direction, if such disposition is employed, then there is the possibility that a bad influence may be had on characteristics of the truck-carried element 3a1 and the ground-mounted element 13. Thus, in order to solve such problem, the air gap detecting means 15, 16 and 17 are disposed at locations in the neighborhood of the actuators 9, 10 and 11 spaced away from the central position 32, and in such construction, an air gap aimed value is corrected and set relying upon a driving current of the truck-carried element 3a1. Thus, an air gap aimed value which relies upon the aforementioned velocity, truck position and track conditions of the truck-carried element 3a1 and a ground-mounted element 13 is corrected, taking also an attracting force produced between the two elements 3a1 and 13 into consideration, with an air gap aimed value which depends upon a driving current to set an air gap aimed value.

An air gap aimed value thus set is outputted from the air gap aimed value setting means 26 by way of a line 33 and transmitted as an air gap instruction value by way of a switch 34 to a substracting circuit 35 which constitutes a negative feedback control system. Also a signal representative of a detected air gap from the air gap detecting means 15 is transmitted to the substracting circuit 35 by way of another switch 36. Thus, a signal representative of a difference between the air gap aimed value and the detected air gap is produced from the substracting circuit 35 and transmitted to a controlling circuit 37. Consequently, the actuator 9 is controlled by the controlling circuit 37 to operate so that the detected air gap may coincide with the air gap aimed value which is the air gap instruction value inputted to the substracting circuit 35.

Figure 4:
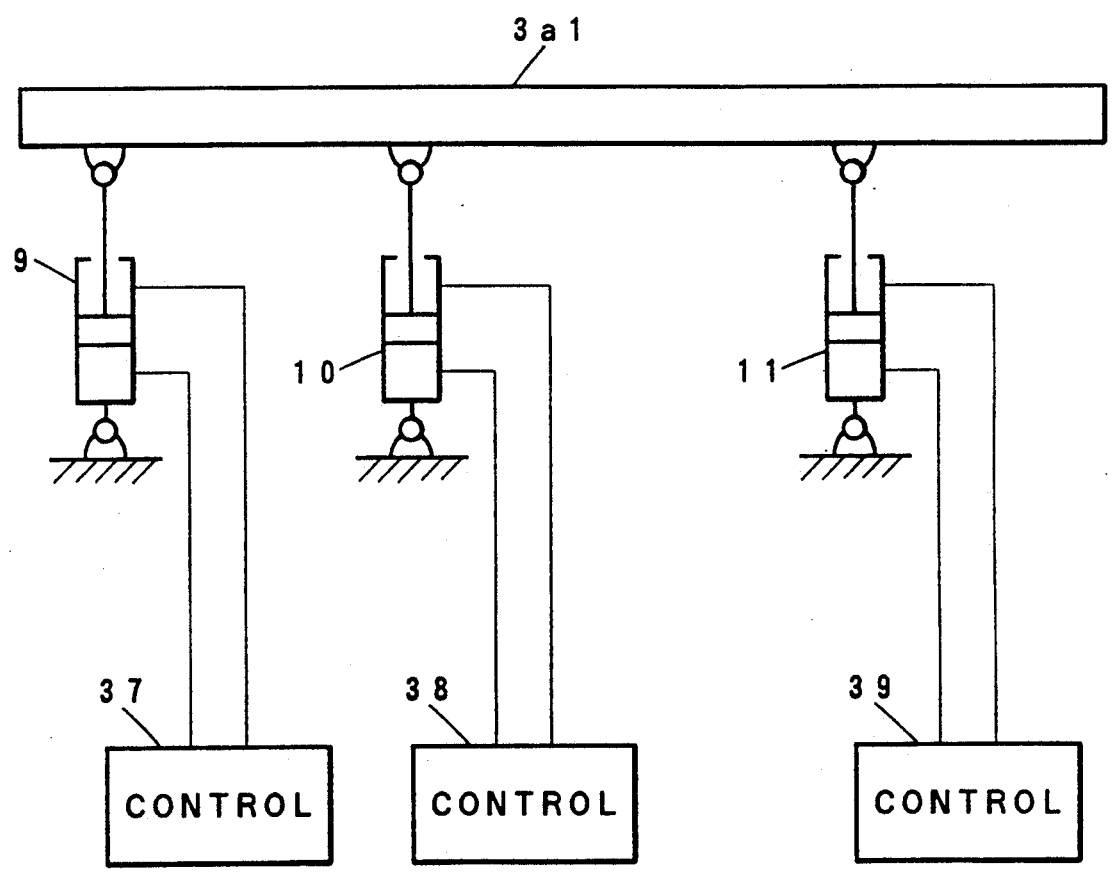
FIG. 4 is a diagrammatic view showing a mechanism for driving a truck-carried element.

Referring now to FIG. 4, such actuators 9, 10 and 11 are shown together with associated elements. Controlling means 37 controls the actuator 9 in the form of a hydraulic double acting cylinder with pressure oil from a hydraulic oil source, and thus, the truck-mounted element 3a1 is driven to be displaced upwardly or downwardly by the actuator 9. Also the remaining actuators 10 and 11 are controlled to be driven similarly by controlling means 38 and 39, respectively.

Referring back to FIGS. 1a and 1b, a signal derived from the subtracting circuit 35 corresponding to the actuator 9 of the first truck 2a1 is supplied to air gap error detecting means 40. The air gap error detecting means 40 detects an air gap error between an air gap aimed value received from the air gap aimed value setting means 26 and a detected air gap received from the air gap detecting means 15 and delivers a signal representative of such air gap error to a function generator 42 by way of a line 41. A signal representative of a velocity detected by the velocity detecting means 25 is also supplied to the function generator 42 by way of another line 43.

Weight detecting means 44 includes a sensor provided on the air spring 5 of the truck 2a1 or the like and detects a weight acting upon the truck 2a1. In response to such weight, a signal representative of a deflective deformation amount of an associated axle spring 8 or the like is produced from spring deformation amount signal generating means 45. Thus, such spring deformation amount signal relating to the weight of the rolling stock is transmitted to the function generator 42 by way of a line 46.

A sink amount and a junction drop amount of the rails 12 have an influence on an air gap error to be detected by the air gap error detecting means 40, and particularly, such air gap error is influenced mainly by the velocity and further by the detected weight. Accordingly, in the air gap error detecting means 40, an air gap error relating to the actuator 9 of the first truck 2a1 is related in prior as a function of a spring deformation amount corresponding to a detected velocity and a detected weight, and a thus related forecasting signal is determined and such forecasting signal is outputted into a line 47.

Figure 5:
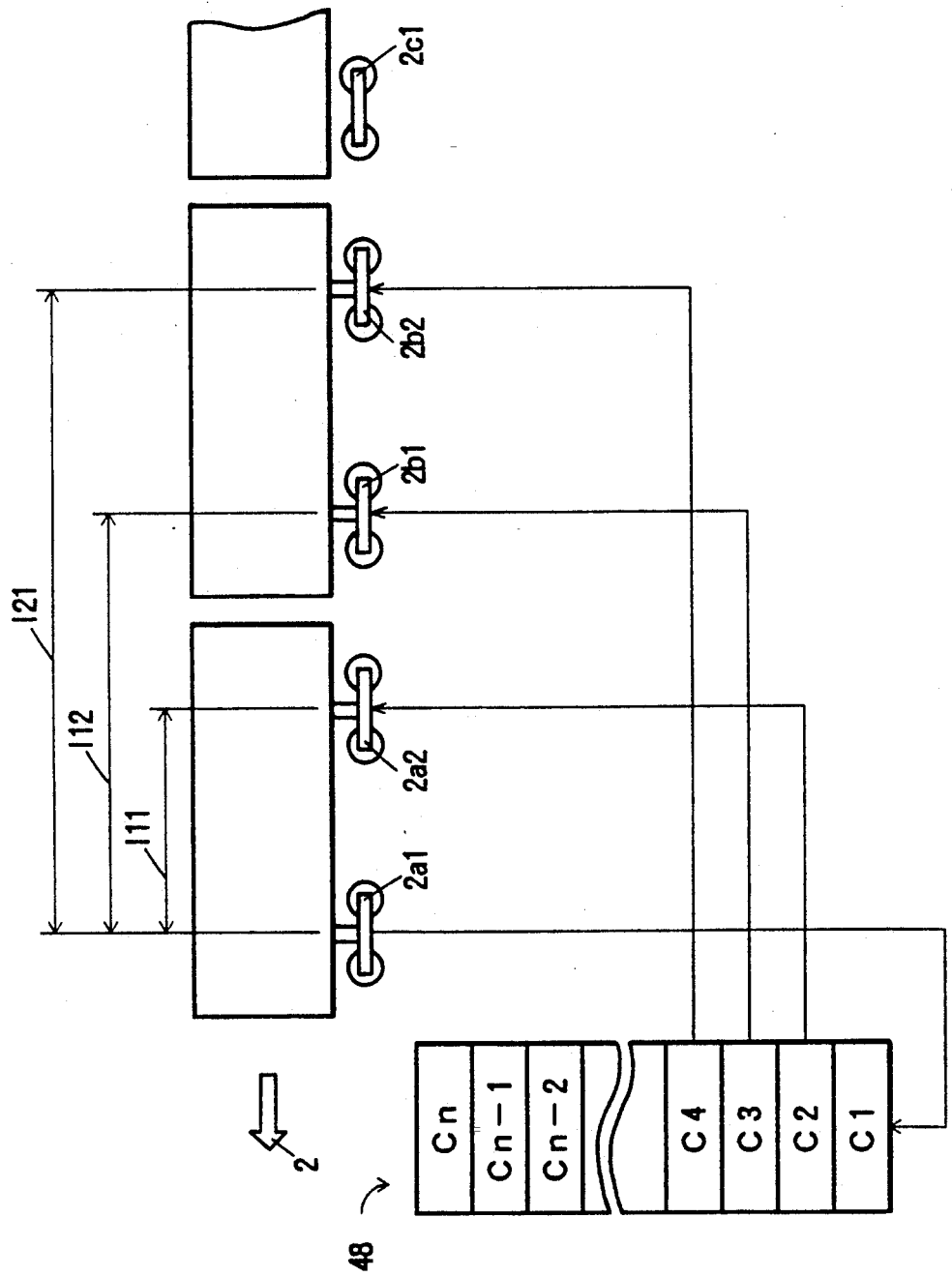
FIG. 5 is a diagrammatic representation illustrating a relationship between a memory and trucks of the rolling stocks shown in FIG. 2.

A forecasting signal outputted from the function generator 42 into the line 47 in this manner is stored into a memory 48 in such a manner as illustrated in FIG. 5. Referring also to FIG. 5, information regarding a point at which the truck-carried element 3a1 currently runs along the rails 12 serving as the running route is delivered from point information generating means 49 to the memory 48 by way of a line 50. Point information from the point information generating means 49 is a signal representative of an absolute position of the point at which the first truck 2a1 runs. In order to obtain such an absolute position of a point, signals individually representative of positions of a plurality of fixed points provided in a spaced relationship along the running route are generated by signal generating means, and calculating means for receiving outputs of the signal generating means and calculating a point between each adjacent fixed points is provided on the rolling stock $1a$. Such calculating means includes pulse generating means for generating pulses having a number corresponding to a rotational speed of a wheel 7 of the truck $2a1$, a counter for counting a number of such pulses, and means for adding a distance corresponding to an output of the counter to an absolute position of a fixed point detected immediately before then to determine an absolute position of a point between such fixed points. In this manner, forecasting signals at individual points provided from the line 47 are successively stored into and kept in storage cells C1 to Cn of the memory 48 in accordance with point information from the point information generating means 49, and stored contents of the individual cells, for example, of the cells C2, C3 and C4, are used as forecasting signals corresponding to the succeeding trucks $2a2$, $2b1$, $2b2$, . . .

Alternatively, point information signals may be produced from the point information generating means 49 and supplied into the line 50 such that information regarding a point may be produced from a position of each of the succeeding trucks $2a2$, $2b1$, $2b2$, . . . in the train with respect to the first truck $2a1$.

By using forecasting signals stored in the memory 48 for the succeeding trucks in this manner, a number corresponding to a rotational speed of a wheel 7 of the truck $2a1$, a counter for counting a number of such pulses, and means for adding a distance corresponding to an output of the counter to an absolute position of a fixed point detected immediately before then to determine an absolute position of a point between such fixed points. In this manner, forecasting signals at individual points provided from the line 47 are successively stored into and kept in storage cells C1 to Cn of the memory 48 in accordance with point information from the point information generating means 49, and stored contents of the individual cells, for example, of the cells C2, C3 and C4, are used as forecasting signals corresponding to the succeeding trucks $2a2$, $2b1$, $2b2$, . . .

Alternatively, point information signals may be produced from the point information generating means 49 and supplied into the line 50 such that information regarding a point may be produced from a position of each of the succeeding trucks $2a2$, $2b1$, $2b2$, . . . in the train with respect to the first truck $2a1$.

By using forecasting signals stored in the memory 48 for the succeeding trucks in this manner, a control delay amount which corresponds to an air gap information generating means 49 and a detected velocity from the velocity detecting means 25, and provides the thus read out forecasting signals to a function discriminator 53 by way of a line 52. Also a signal representative of a detected velocity from the velocity detector 25 and another signal which is transmitted by way of the line 46 from the means 45 for detecting a spring deformation amount in response to an output from the rolling stock total weight detecting means 44 are supplied to the function discriminator 53. Since a control delay amount which corresponds to an air gap error of the first truck $2a1$ is stored as a function of the function generator 42 in the memory 48 together with point information, the function discriminator 53 corresponding to the actuator 18 of the succeeding second truck $2a2$ has a function of inversely calculating a control delay amount in response to such stored forecasting signals, a detected velocity and a spring deformation amount related to a weight of the rolling stock. A control delay amount at a predictor controllable point ahead is determined by inverse calculation in accordance with a function with which the function discriminator 53 performs inverse calculation, and negative feedback air gap control is performed using the actuator 18 in accordance with the thus inversely calculated control delay amount and information of the same kind which has made a foundation of air gap control with the first truck $2a1$.

Air gap aimed value setting means 55 is provided for air gap control of the truck $2a2$, and a truck position signal representative of a position of the second truck $2a2$ in the train is delivered from truck position signal generating means 56 to the air gap value setting means 55 while another signal representative of a detected velocity is also delivered from the velocity detecting means 25 to the air gap aimed value setting means 55. A further signal representative of a track condition in which the truck $2a2$ runs is delivered from the track condition signal generating means 28 to the air gap aimed value setting means 55, and besides a deformation amount signal corresponding to a driving current of the truck-carried element $3a2$ of the truck $2a2$ is delivered to the air gap aimed value setting means 55 by way of the line 31 from the deformation amount signal generating means 30. Thus, a signal representative of an air gap aimed value of the truck $2a2$ is derived from a line 57 in a similar manner as described hereinabove. An air gap aimed value from the line 57 is provided to a subtracting circuit 59 by way of a switch 58, and another signal representative of a detected air gap from the air gap detecting means 21 is delivered also to the subtracting circuit 59 by way of another switch 62. Then, an output from the subtracting circuit 59 is supplied to an adder 60. At the adder 60, a signal representative of a control delay amount derived from the function discriminator 53 by way of the line 54 is added to the output of the subtracting circuit 59 to effect correction thereof, and a thus corrected signal from the adder 60 is supplied as an air gap instruction value to controlling means 63 by way of a line 61. Consequently, the actuator 18 drives the truck-carried element $3a2$ upwardly or downwardly so that a thus corrected air gap may be provided. In this manner, since predictor control can be performed, with regard to those factors which relate to a control delay with the first stock truck $2a1$, on a succeeding rolling stock, for example, on the second truck $2a2$ to adjust an air gap, the air gap can be controlled to a smaller value on each of the second and succeeding trucks. Consequently, a high efficiency can be attained with the linear motor.

It is to be noted that, while the foregoing embodiment is described in connection with the actuator 9 of the truck $2a1$ and the actuator 18 of the succeeding truck $2a2$, the actuator 19 is predictor controlled in response to the actuator 10 while also the actuator 20 of the succeeding truck $2a2$ is predictor controlled in response to the actuator 11. In this manner, similar control delay amounts are used for the other succeeding actuators corresponding to the actuators 9, 10 and 11 of the first truck $2a1$.

Furthermore, the truck weight detecting means 44 are provided for each of the rolling stocks $1a$, $1b$, $1c$, . . . and $1i$, and truck-carried element driving current detecting means similar to the means 29 for detecting a driving current of the truck-carried element 3a1 is provided for each driving current controlling unit. Meanwhile, the velocity detecting means 25 are used commonly for all of the rolling stocks 1a to 1i. Further, outputs of the track condition signal generating means 28 and the point information generating means 49 are used after they are corrected by delaying them for positions of the trucks 2a1, 2a2, 2b1, 2b2, ... with reference to a position of the first truck 2a1 in response to a detected velocity by the velocity detecting means 25.

Ground-mounted element detecting means 71 for detecting presence or absence of a ground-mounted element 13 is mounted adjacent the actuator 15 at a forward location of the truck-carried element 3a1 of the first truck 2a1. Meanwhile, ground-mounted element detecting means 72 for detecting presence or absence of a ground-mounted element 13 is mounted at a rear location of the truck-carried element 3a1 adjacent the actuator 16. Similarly, ground-mounted element detecting means 73 and 74 are mounted on the truck 2a2, and similar means are provided similarly on each of the other trucks 2b1, 2b2, ... When a ground-mounted element 13 is detected by the ground-mounted element detecting means 71, the switches 34 and 36 are connected in such switching conditions as shown in FIG. 1a, and air gap control is performed so that the efficiency of the linear motor 14 may be high.

When it is detected by the ground-mounted element detecting means 71 that there is no ground-mounted element 13, the switches 34 and 36 are switched into conditions different from those of FIG. 1a. Consequently, the actuator 9 is controlled to operate so that the truck-carried element 3a1 may be raised to a predetermined upper position. Stroke determining means 76 detects, from an output of displacement amount detecting means 77, a stroke of the actuator 9, that is, a vertical position of the truck-carried element 3a1 at a time immediately before a ground-mounted element 13 disappears, and then determines a stroke of the actuator 9 so that the air gap may be increased a little with respect to the vertical position of the truck-carried element 3a1 at the time immediately before the ground-mounted element 13 disappears. The stroke determining means 76 delivers a signal representative of the thus determined stroke to the subtracting circuit 35 over a line 78 by way of the switch 34. An output of the displacement amount detecting means 77 is also supplied to the subtracting circuit 35 by way of the switch 36.

Thus, when a ground-mounted element 13 is no more detected, the actuator 9 is driven so that the air gap may be increased, and consequently, even if an installation error of a ground-mounted element 13, vibrations of the rolling stock 1a or a control delay amount exists, the truck-carried element 3a1 can be prevented from colliding with a succeeding ground-mounted element 13. Thus, when a ground-mounted element 13 is not detected any more, the truck-carried element 3a1 is negative feedback controlled to be raised so that the air gap may be increased.

Such construction as denoted by reference numeral 92 in FIG. 1a is similar to those for the actuators 16 and 17 corresponding to the ground-mounted element detecting means 72, and stroke determining means 79 and displacement amount detecting means 80 are provided similarly for the ground-mounted detecting means 73 corresponding to the actuator 18. Such construction is similar to those for the other actuators 19 and 20 and also similar to those for the succeeding trucks.

Figure 6:
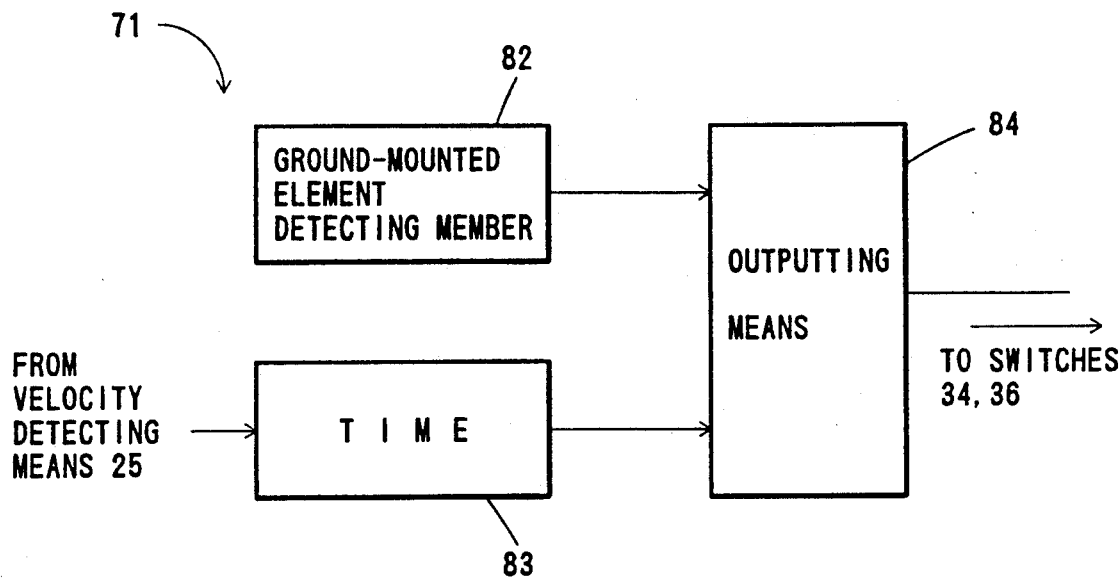
FIG. 6 is a block diagram showing detailed construction of ground-mounted element detecting means of the air gap controlling system of FIGS. 1a and 1b.

Detailed construction of the ground-mounted element detecting means 71 is shown in FIG. 6. Referring to FIG. 6, the ground-mounted element detecting means 71 shown includes a ground-mounted element detecting member 82 for detecting a ground-mounted element 13, time setting means 83 for setting a predetermined time in response to a signal received from the velocity detecting means 25 and representative of a detected velocity of the train, and outputting means 84 for delivering, when a ground-mounted element 13 is detected after the ground-mounted element detecting member 82 detects absence of a ground-mounted element 13 and then the presence of such ground-mounted element 13 is continuously detected for a predetermined time set by the time setting means 83 in accordance with a detected velocity received from the velocity detecting means 25, to the switches 34 and 36 a signal representing that there is a ground-mounted element 13 to return the switching conditions of the switches 34 and 36 to such as shown in FIG. 1a. Consequently, air gap control can be executed so that the efficiency of the linear motor may be high. In this manner, even if a ground-mounted element 13 is detected by the ground-mounted element detecting member 82, air gap control is not executed immediately, but the time by the time setting means 83 is set shorter as the velocity is higher and air gap control is enabled only after a ground-mounted element 13 is continuously detected for such set time. Consequently, it can be prevented that, when a truck passes a branching portion of the rails 12 or the like, another rail crossing the pair of rails 12 is detected as a ground-mounted element 12 in error.

Figure 7:
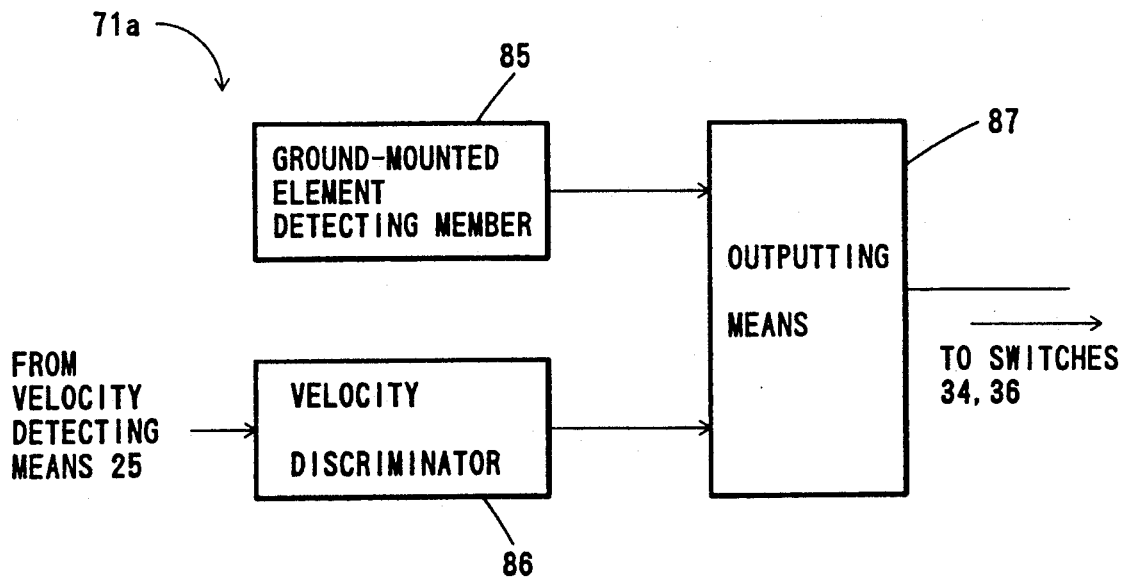
FIG. 7 is a similar view but showing detailed construction of another form of the ground-mounted element detecting means.

Referring now to FIG. 7, there is shown detailed construction of another ground-mounted element detecting means 71a. The ground-mounted element detecting means 71a includes a ground-mounted element detecting member 85 for detecting presence or absence of a ground-mounted element 13, and velocity discriminating means 86 for judging in accordance with a signal representative of a detected velocity received from the velocity detecting means 25 whether or not the running velocity is lower than a predetermined level such as, for example, 5 km/h. When the running velocity is lower than such predetermined velocity after a ground-mounted element 13 is no more detected by the ground-mounted element detecting member 85, outputting means 87 produces a signal representing that there is no ground-mounted element 13 and delivers such signal to the switches 34 and 36 to maintain the switching conditions of the switches 34 and 36 after they have been switched from the conditions of FIG. 1a, thereby to prevent the ground-mounted element 3a1 from being moved down by execution of air gap control in error.

Figure 8:
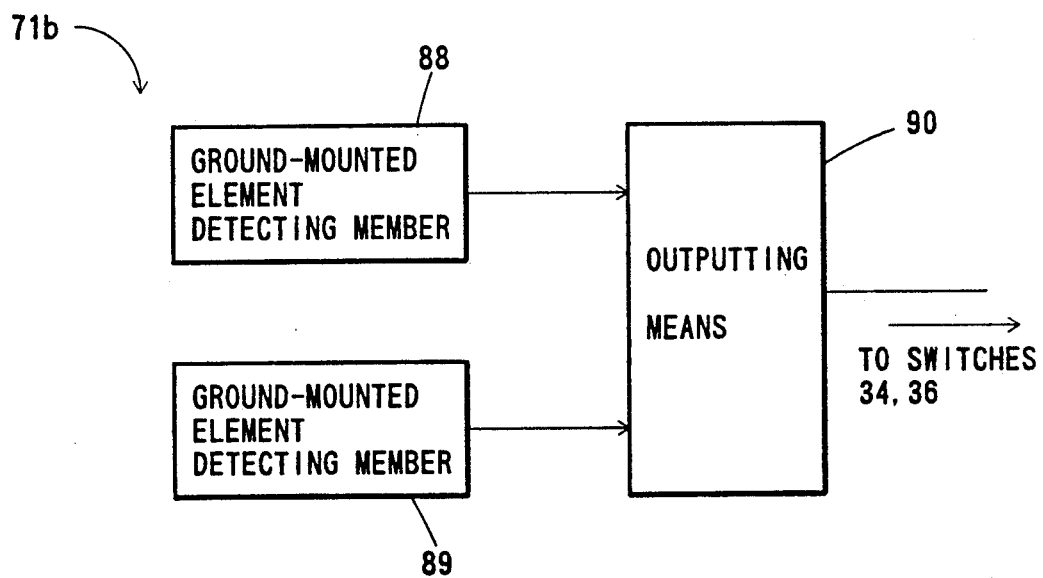
FIG. 8 is a similar view but showing detailed construction of a further form of the ground-mounted element detecting means.

Referring now to FIG. 8, there is shown detailed construction of a further ground-mounted element detecting means 71b. The ground-mounted element detecting means 71b includes a pair of ground-mounted element detecting members 88 and 89 disposed in a spaced relationship from each other in a running direction of the rolling stock 1a. When a ground-mounted element 13 is detected simultaneously by the ground-mounted element detecting members 88 and 89, outputting means 90 produces a signal representing that there is a ground-mounted element so that air gap control may be executed while such switching conditions of the switches 34 and 35 as shown in FIG. 1a are established.

In this manner, when the velocity of a rolling stock is very low, or even when a rolling stock stops, it is prevented with certainty that such possible erroneous air gap control that the truck-carried element 3a1 is displaced downwardly is executed as a result of such an error that a rail which crosses with the rails 12 in the neighborhood of a branching location or the like is detected as a ground-mounted element 13.

While the controlling system including the detecting means 71 for detecting presence or absence of a ground-mounted element and the stroke determining means 76 for the actuator 9 in the embodiment described above is constructed independently for each of the actuators 9 similarly to the negative feedback control system for the air gap detecting means 15, when the rolling stock 1a is running at a very low velocity or is in a stopping condition, the ground-mounted element detecting means 71 and the stroke determining means 76 may be used commonly for each of the truck-carried elements 3a1, 3a2, ...

Further, an output of the ground-mounted detecting means 71 may be provided to the memory 48 by way of a line 91 so that, when it is detected that a ground-mounted element 13 has disappeared, such output may be used as information for predictor control of air gaps of the succeeding trucks 2a2, 2b1, 2b2, ... such that, when absence of a ground-mounted element 13 is detected, storage into the memory 48 may be stopped.

Furthermore, when absence of a ground-mounted element 13 is detected by the ground-mounted element detecting means 71, in determining an actuator stroke on each of the succeeding trucks 2a2, 2b1, 2b2, ..., an amount of increase of an air gap may be determined taking such predictor control of an air gap as described above into consideration.

It is also possible to cause operation of the ground-mounted element detecting means 73, 74, ... of the succeeding trucks 2a2, 2b1, 2b2, ... to be performed in accordance with forecasting signals stored in the memory 48 of the first truck 2a1 and point information received from the point information generating means 49.

The ground-mounted element detecting means 71 may otherwise be provided on the rolling stock body 1a.

Referring now to FIG. 9, there is shown electric construction of a modification to the air gap controlling system of the embodiment described above. The air gap controlling system shown in modified such that the ground-mounted element driving current detecting means 29 and the ground-mounted element detecting means 71 to 74 and various elements associated with them as well as the track condition signal generating means 28 are omitted. Also with the modified air gap controlling system of such construction, the air gap between a truck-carried element and a ground-mounted element can be predictor controlled to a small value to assure a high efficiency of the linear motor.

Referring now to FIG. 10, there is shown electric construction of another modification to the air gap controlling system of the embodiment described above. The present modification is a modification to the modified air gap controlling system shown in FIG. 9 in that it additionally includes the ground-mounted element driving current detecting means 29 and associated elements, which are included in the air gap controlling system of the embodiment described above. Also with the modified air gap controlling system of such construction, the air gap between a truck-carried element and a ground-mounted element can be predictor controlled to a small value to assure a high efficiency of the linear motor.

Figure 11A:
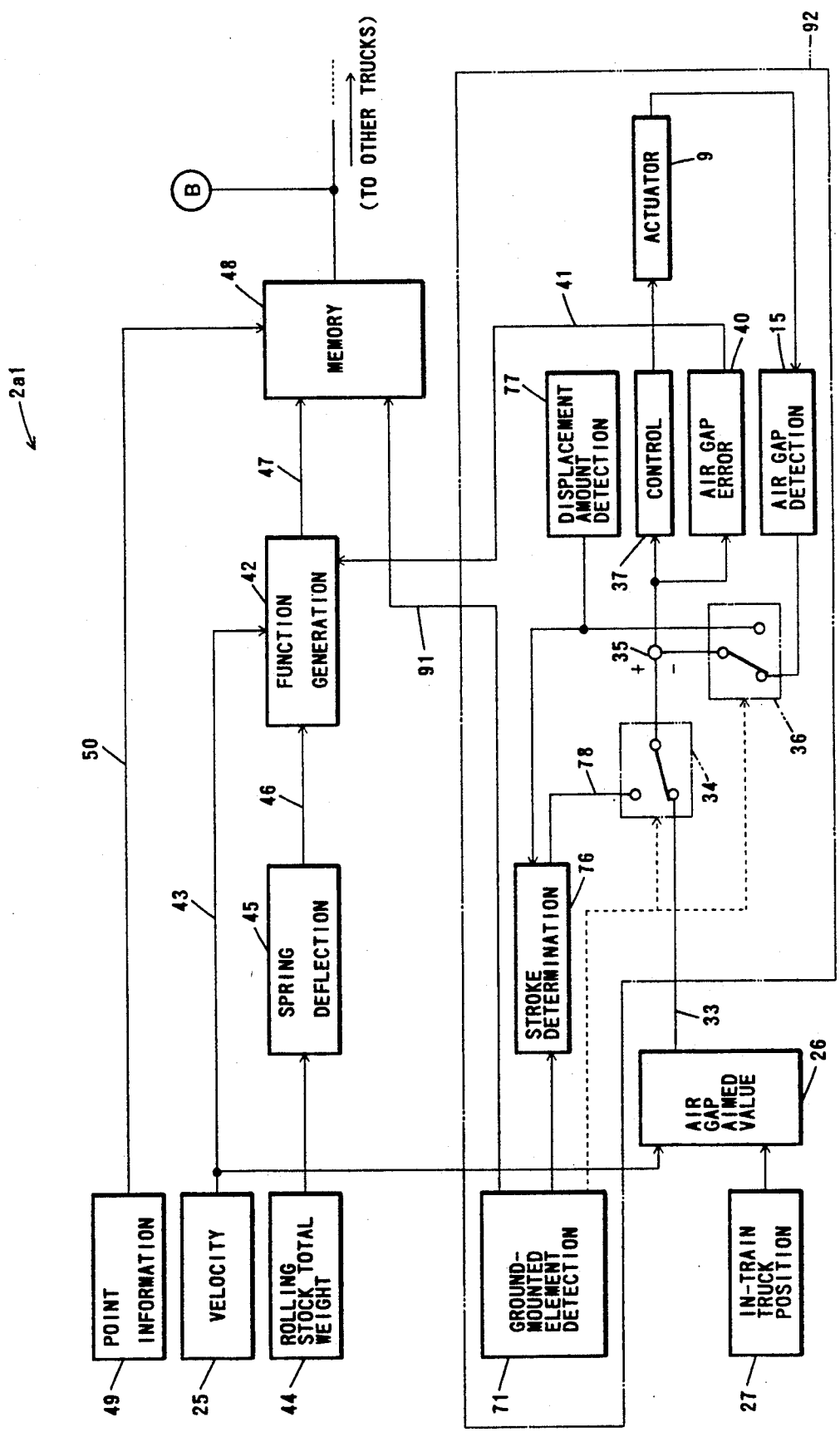

FIGS. 11a and 11b show electric construction of a further modification to the air gap controlling system of the embodiment described above. The air gap controlling system is modified such that the ground-mounted element driving current detecting means 29 and associated elements as well as the track condition signal generating means 28 are omitted, but it includes the ground-mounted element detecting means 71 to 74 and associated elements as different from the modified air gap controlling system shown in FIG. 9. Also with the modified air gap controlling system of such construction, the air gap between a truck-carried element and a ground-mounted element can be predictor controlled to a small value to assure a high efficiency of the linear motor.

On the other hand, the air gap controlling system of the embodiment described hereinabove may be simplified by provision, in place of individual provision of the air gap detecting means 15 and the ground-mounted element detecting means 71, of means for judging, when an air gap detected by the air gap detecting means 15 is increased to a predetermined high value, that no ground-mounted element 13 is present.

Alternatively, the air gap detecting means 15 and the ground-mounted element detecting means 71 may be constructed such that they may detect a junction between adjacent ground-mounted elements 13 sufficiently across the width of such junction or may be constructed otherwise such that, as for information in a direction in which an air gap may increase suddenly, taking a velocity of a rolling stock into consideration similarly to such construction for prevention of erroneous detection in detection of a ground-mounted element as described above, a detected velocity value is determined as a regular detected value only after a condition that the air gap presents a suddenly increased value continues for a predetermined period of time corresponding to the detected velocity. With such alternative construction, it is sure to prevent undesired upward or downward movement of a truck-carried element by an actuator and to prevent possible collision between a truck-carried element and a ground-mounted element.

Such construction as described below can also be employed. In particular, the point information generating means 49 produces point information in accordance with relative positions of the succeeding trucks 2a2, 2b1, 2b2, ... in the train with reference to the first truck 2a1, and in this instance, the track condition signal generating means 28 and information regarding a truck-carried element driving current may be omitted so that negative feedback control of an air gap may be executed, with the first truck 2a1, in response to an output of the air gap aimed value setting means 26 in accordance with velocity information, information regarding a weight of the rolling stock and truck position information while an amount of control delay is supplied, with each of the succeeding trucks 2a2, 2b1, 2b2, ..., as predictor control information to the negative feedback controlling system in addition to such relative point information as described above. With such construction, where the truck-carried element 3a1 and so forth are primary coils of the linear motor, only such information as can be obtained readily from the rolling stocks 1a, 1b, 1c, ... and 1i is required for air gap control. Consequently, the construction can be simplified. The amount of increase of an air gap to be lost upon control is 1 mm or so or 2 to 4 mm or so to the utmost and sufficiently remains in a practical range. When a rolling stock runs along a curve, a ground-mounted element is installed low so that no influence of a track condition is had on a linear track.

Having now fully described the invention, it will be apparent to one of ordinary skill in the art that many changes and modifications can be made thereto without departing from the spirit and scope of the invention as set forth herein.

What is claimed is:

1. An air gap controlling system for a linear motor which is constituted from a truck-carried element mounted on each of a plurality of trucks of each of a plurality of rolling stocks of a train and a plurality of ground-mounted elements secured to the ground along a running route of said trucks, comprising:

driving means for driving each of the truck-carried elements to be displaced upwardly or downwardly;

velocity detecting means for detecting a running speed of said rolling stocks;

truck position signal generating means for generating a truck position signal indicative of a position of each of the trucks in said train;

air gap aimed value setting means provided on each of said trucks for setting an aimed value of an air gap between each of the truck-carried elements of each of said trucks and an opposing ground-mounted element in response to outputs of the corresponding velocity detecting means and the corresponding truck position signal generating means;

air gap detecting means provided for each of the driving means for detecting an air gap between the corresponding truck-carried element and an opposing ground-mounted element;

controlling means provided for each of said driving means for controlling the driving means in response to an air gap instruction value and an output of a detected air gap of the corresponding air gap detecting means so that the detected air gap may be equal to the air gap instruction value;

air gap error detecting means provided on a first one of said trucks for detecting an air gap error between an air gap aimed value from the corresponding air gap aimed value setting means and a detected air gap from the corresponding air gap detecting means;

the air gap aimed value from the air gap aimed value setting means on the first truck being provided as an air gap instruction value to the controlling means for the first truck to effect control of an air gap of the first truck;

point information generating means for generating information of a point where each of the truck-carried elements passes along the running route;

weight detecting means for detecting a weight of each of said rolling stocks;

forecasting signal generating means for generating forecasting signals from a relation of an air gap error from said air gap error detecting means to a detected velocity from said velocity detecting means and detected weights from the weight detecting means;

storage means for storing therein forecasting signals from said forecasting signal generating means in a corresponding relationship to point information from said point information generating means; and correcting means provided on those of said trucks succeeding to said first truck for correcting air gap aimed values from the air gap aimed value setting means provided on the succeeding trucks with forecasting signals from said storage means corresponding to points at which the succeeding trucks run and for providing the thus corrected air gap aimed values as air gap instruction values to the controlling means for the succeeding trucks.

2. An air gap controlling system for a linear motor as claimed in claim 1, wherein said point information generating means includes signal generating means for generating signals representative of positions of a plurality of fixed points provided in a spaced relationship along the running route, and means provided on one of said rolling stocks for receiving an output of said signal generating means and calculating a point between two adjacent ones of said fixed points in accordance with the thus received output of said signal generating means.

3. An air gap controlling system for a linear motor as claimed in claim 1, wherein said point information generating means produces information regarding points corresponding to relative positions of the succeeding trucks in the train with respect to said first truck.

4. An air gap controlling system for a linear motor as claimed in claim 1, further comprising track condition signal generating means for generating a track condition signal indicative of a condition of a track where each of said trucks runs, and wherein each of said air gap aimed value setting means sets an aimed value of an air gap also in response to a track condition signal received from the corresponding track condition signal generating means.

5. An air gap controlling system for a linear motor which is constituted from a truck-carried element mounted on each of a plurality of trucks of each of a plurality of rolling stocks of a train and a plurality of ground-mounted elements secured to the ground along a running route of said trucks, comprising:

driving means for driving each of the truck-carried elements to be displaced upwardly or downwardly;

velocity detecting means for detecting a running speed of said rolling stocks;

deformation amount signal generating means for detecting a driving electric current of each of the truck-carried elements to produce a deformation amount signal representative of amounts of deformation of the truck-carried element and an opposing ground-mounted element corresponding the driving electric current;

truck position signal generating means for generating a truck position signal indicative of a position of each of the trucks in said train;

air gap aimed value setting means provided on each of said trucks for setting an aimed value of an air gap between each of the truck-carried elements of each of said trucks and an opposing ground-mounted element in response to outputs of the corresponding velocity detecting means, the corresponding truck position signal generating means and the corresponding deformation amount signal generating means;

air gap detecting means provided for each of the driving means for detecting an air gap between the corresponding truck-carried element and an opposing ground-mounted element;

controlling means provided for each of said driving means for controlling the driving means in response to an air gap instruction value and an output of a detected air gap of the corresponding air gap detecting means so that the detected air gap may be equal to the air gap instruction value;

air gap error detecting means provided on a first one of said trucks for detecting an air gap error between an air gap aimed value from the corresponding air gap aimed value setting means and a detected air gap from the corresponding air gap detecting means;

the air gap aimed value from the air gap aimed value setting means on the first truck being provided as an air gap instruction value to the controlling means for the first truck to effect control of an air gap of the first truck;

point information generating means for generating information of a point where each of the truck-carried elements passes along the running route;

weight detecting means for detecting a weight of each of said rolling stocks;

forecasting signal generating means for generating forecasting signals from a relation of an air gap error from said air gap error detecting means to a detected velocity from said velocity detecting means and detected weights from the weight detecting means;

storage means for storage therein forecasting signals from said forecasting signal generating means in a corresponding relationship to point information from said point information generating means; and correcting means provided on those of said trucks succeeding to said first truck for correcting air gap aimed values from the air gap aimed value setting means provided on the succeeding trucks with forecasting signals from said storage means corresponding to points at which the succeeding trucks run and for providing the thus corrected air gap aimed values as air gap instruction values to the controlling means for the succeeding trucks.

6. An air gap controlling system for a linear motor which is constituted from a truck-carried element mounted on each of a plurality of trucks of each of a plurality of rolling stocks of a train and a plurality of ground-mounted elements secured to the ground along a running route of said trucks, comprising:

driving means for driving each of the truck-carried elements to be displaced upwardly or downwardly;

velocity detecting means for detecting a running speed of said rolling stocks;

truck position signal generating means for generating a truck position signal indicative of a position of each of the trucks in said train;

air gap aimed value setting means provided on each of said trucks for setting an aimed value of an air gap between each of the truck-carried elements of each of said trucks and an opposing ground-mounted element in response to outputs of the corresponding velocity detecting means and the corresponding truck position signal generating means;

air gap detecting means provided for each of the driving means for detecting an air gap between the corresponding truck-carried element and an opposing ground-mounted element;

ground-mounted element detecting means provided for each of the driving means for detecting presence or absence of a ground-mounted element;

controlling means provided for each of the driving means for determining, when presence of a ground-mounted element is detected by the corresponding ground-mounted element detecting means, an aimed value from the corresponding air gap aimed value setting means as an air gap instruction value and controlling the corresponding driving means in response to the air gap instruction value and an output of a detected air gap from the corresponding air gap detecting means so that the detected air gap may be equal to the air gap instruction value but for controlling, when presence of no ground-mounted element is detected by the corresponding ground-mounted element detecting means, the corresponding driving means so that the corresponding truck-carried element may be positioned at a predetermined upper position;

air gap error detecting means provided on a first one of said trucks for detecting an air gap error between an air gap aimed value from the corresponding air gap aimed value setting means and a detected air gap from the corresponding air gap detecting means;

the air gap aimed value from the air gap aimed value setting means on the first truck being provided as an air gap instruction value to the controlling means for the first truck to effect control of an air gap of the first truck when a ground-mounted element opposing to the truck-carried element on the first truck is present;

point information generating means for generating information of a point where each of the truck-carried elements passes along the running route;

weight detecting means for detecting a weight of each of said rolling stocks;

forecasting signal generating means for generating forecasting signals from a relation of an air gap error from said air gap error detecting means to a detected velocity from said velocity detecting means and detected weights from the weight detecting means;

storage means for storage therein forecasting signals from said forecasting signal generating means in a corresponding relationship to point informaion from said point information generating means; and correcting means provided on those of said trucks succeeding to said first truck for correcting air gap aimed values from the air gap aimed value setting means provided on the succeeding trucks with forecasting signals from said storage means corresponding to points at which the succeeding trucks run and for providing the thus corrected air gap aimed values as air gap instruction values to the controlling means for the succeeding trucks when an opposing ground-mounted element is present.

7. An air gap controlling system for a linear motor which is constituted from a truck-carried element mounted on each of a plurality of trucks of each of a plurality of rolling stocks of a train and a plurality of ground-mounted elements secured to the ground along a running route of said trucks, comprising:

driving means for driving each of the truck-carried elements to be displaced upwardly or downwardly;

velocity detecting means for detecting a running speed of said rolling stocks;

air gap instruction value generating means for generating an air gap instruction value with which an air gap between each of the truck-carried elements and an opposing ground-mounted element is to be adjusted to a predetermined value;

ground-mounted element detecting means provided for each of the driving means of detecting presence or absence of a ground-mounted element opposing to the corresponding truck-carried element; and controlling means for controlling each of the driving means, when presence of no opposing ground-mounted element is detected by the corresponding ground-element detecting means, so that the corresponding truck-carried element may be positioned at a predetermined upper position but for controlling each of the driving means, when presence of an opposing ground-mounted element is detected, so that an air gap between the corresponding truck-carried element and the opposing ground-mounted element may be equal to a value defined by an air gap instruction value from the corresponding air gap instruction value generating means.

8. An air gap controlling system as claimed in claim 6 wherein each of the ground-mounted element detecting means develops a signal representative of presence of a ground-mounted element when a ground-mounted element is continuously detected for a predetermined period of time corresponding to a running velocity of the rolling stocks detected by said velocity detecting means.

9. An air gap controlling system as claimed in claim 6 wherein each of the ground-mounted detecting means continues to develop a signal representative of presence of no ground-mounted element when the running velocity of the rolling stocks is lower than a predetermined level after a condition wherein a ground-mounted element is no more detected has been entered.

10. An air gap controlling system as claimed in claim 6 wherein each of the ground-mounted element detecting means includes a pair of ground-mounted element detecting members provided on each of the rolling stocks in a spaced relationship in the running direction of the rolling stocks for detecting presence or absence of a ground-mounted element, and outputting means for developing a signal representative of presence of a ground-mounted element when a ground-mounted element is detected simultaneously by both of said ground-mounted element detecting members.

* * * * *